United States Patent [19]

Firari et al.

[11] Patent Number: 5,486,806
[45] Date of Patent: Jan. 23, 1996

[54] ANTI-HIJACKING AND THEFT PREVENTION DEVICE FOR MOTOR VEHICLES

[76] Inventors: Harold A. Firari, N6604 Shorewood Hills Rd., Lake Mills, Wis. 53551; John A. Werner, 11602 Watertown Plank Rd., Wauwatosa, Wis. 53226

[21] Appl. No.: 336,815

[22] Filed: Nov. 9, 1994

[51] Int. Cl.$^6$ ............................................ B60R 25/10
[52] U.S. Cl. .................... 340/426; 340/425.5; 307/10.2; 307/10.3; 307/10.6; 180/284; 180/287
[58] Field of Search .................. 340/425.5, 426; 307/10.2, 10.3, 10.6; 180/284, 287

[56] References Cited

U.S. PATENT DOCUMENTS

| | | | |
|---|---|---|---|
| 2,881,789 | 4/1959 | Finazzo . | |
| 3,550,717 | 12/1970 | Franklin . | |
| 3,687,216 | 8/1972 | Tracy | 180/287 |
| 3,700,063 | 10/1972 | Dunseath | 180/287 |
| 3,834,484 | 9/1974 | Sangster | 184/6 |
| 3,907,060 | 9/1975 | Burton et al. | 184/6 |
| 3,910,372 | 10/1975 | Mozzar | 180/287 |
| 4,084,657 | 4/1978 | Bradley et al. | 180/287 |
| 4,133,410 | 1/1979 | Krusoe | 180/287 |
| 4,495,910 | 1/1985 | Taylor | 123/198 B |
| 5,168,957 | 12/1992 | Ross | 180/287 |

FOREIGN PATENT DOCUMENTS

| | | |
|---|---|---|
| 2596710 | 9/1987 | France . |
| 2620398 | 9/1989 | France . |
| 469957 | 8/1937 | United Kingdom . |

*Primary Examiner*—John K. Peng
*Assistant Examiner*—Daryl C. Pope
*Attorney, Agent, or Firm*—Wheeler & Kromholz

[57] ABSTRACT

An anti-hijacking and theft prevention device for motor vehicles having a fuel restricting solenoid valve assembly including an interchangeable solenoid operated fuel restricting valve and a circuit for operating the system. The solenoid operated fuel restricting valve is installed in the vehicle's fuel line. When the ignition key is inserted into the ignition switch of a vehicle and turned to the "on" position and the engine is started, a timer will start to count down from a predetermined period of time. If the system is not disabled by activating a hidden switch during the count down period, the solenoid operated fuel restricting valve moves from an open position to a closed position. The solenoid valve has a small valve orifice which allows only a small restricted amount of fuel to flow through the valve assembly in the fuel line. While the amount of fuel is sufficient to keep the engine from stalling, the vehicle will be capable of a speed of no more than 5 to 10 miles per hour.

8 Claims, 3 Drawing Sheets

ANTI-HIJACKING AND THEFT PREVENTION DEVICE FOR MOTOR VEHICLES

BACKGROUND OF THE INVENTION

While there are many anti-hijacking and theft prevention devices available for motor vehicles today, none function in the novel way of my invention and provide both anti-hijacking protection and theft prevention. As the number of vehicle thefts increase each year, many vehicle owners have sought ways to protect their automobiles, motorcycles, etc. The most common theft prevention devices on the market today include a horn, siren, or other audible signal which sounds when the perpetrator breaks a window, forcibly opens a door, or lifts the vehicle while connecting it to a tow truck. These systems can be further modified to include devices that disable the ignition system or completely cut off the fuel supply. With those modifications, the vehicle is rendered inoperable. Some theft prevention systems even include a radio sending unit that sends a signal to a receiving device in the possession of the vehicle owner, the signal being sent when a perpetrator is attempting to steal the vehicle.

Most of the systems available today are ineffective in preventing or deterring vehicle hijacking. Hijacking occurs when a perpetrator approaches the vehicle owner or operator as the owner or operator is entering the vehicle or is in the vehicle with the engine running but the vehicle stopped. If the engine is running the owner or operator must turn off the ignition before leaving the vehicle. If this is not possible at the time of hijacking, the owner or operator must energize the unit with the remote control after leaving the vehicle. The perpetrator will forcibly acquire the keys from the owner or operator and thus be allowed to enter and start the vehicle in the normal manner or will simply force the owner or operator to give up possession of the running vehicle. The owner or operator must energize the anti-theft unit with the remote control after giving up possession of the vehicle. Because most common alarm systems are disabled with a transmitter attached to the key chain or when the vehicle door is opened with a key or when the ignition key is placed within the ignition switch, these alarm systems are ineffective at preventing or hindering vehicle hijacking. Even those systems having remote transmitters often require the engine to be turned off before the alarm can be used.

The present invention effectively deters both vehicle theft and vehicle hijacking in a novel way. It is an object of the present invention to provide an anti-hijacking theft prevention device that effectively disables the utility of a vehicle thus rendering the vehicle useless to the perpetrator. The device deters both vehicle hijacking as well as theft. It is a further object to provide such a device that the owner or operator will find easy to operate while effectively preventing vehicle hijacking and theft. It is yet a further object to provide such a device that can be used on any vehicle, provided the vehicle's engine uses some type of fuel. It is yet a further objective to provide such a device that is safe for all persons in the vicinity of the stolen vehicle, including the perpetrator, in that the vehicle will not become completely disabled in traffic.

SUMMARY OF THE INVENTION

The present invention comprises an anti-hijacking and theft prevention device for motor vehicles. The device includes a solenoid valve assembly which is installed in the vehicle's fuel line. The solenoid of the solenoid valve assembly has a fuel restricting valve attached to its plunger. The device further includes a switch, an audible beeper, and a control means having a timer for controlling the operation of the solenoid valve with respect to the vehicle's ignition switch.

When the solenoid operated fuel restricting valve is in the open position, fuel freely flows through the valve chamber of the solenoid valve assembly and does not effect the operation of the motor vehicle. The solenoid valve has a very small orifice or aperture formed therethrough. When the solenoid operated fuel restricting valve moves into its closed position, fuel flow is restricted. Only the restricted amount of fuel that can pass through the small orifice in the valve is supplied to the vehicle's engine.

The switch is mounted in a concealed location known only to the owner or operator of the vehicle. Typically, good locations include on the side of the driver's seat, under the driver's seat or under the dashboard. The control means and audible beeper are installed in any convenient location.

When the ignition key is turned to the "on" position and the engine is started, the timer will start to count down to its "off" position while the beeper simultaneously sounds. The beeper signals the operator of the vehicle that the timer has started and will restrict the vehicle's fuel flow in a predetermined period of time. When the timer times out, the fuel restricting solenoid valve is activated. The solenoid valve having the fuel restricting orifice moves into the closed position causing an almost complete shutoff of fuel flow to the engine. Only the small amount of fuel that can pass through the orifice will be supplied to the vehicle's engine. The engine will continue to run but at a very slow and hesitating speed. The power brakes and power steering systems will still be operational but the vehicle will be capable of only very low speeds, e.g. 5 to 10 miles per hour. The speed the vehicle is capable of will be determined by the level of fuel flow restriction. The greater the restriction, the lower the speed.

The owner or operator of the vehicle, who knows where the hidden switch is located will immediately press it after starting the vehicle and hearing the beeper. Provided the switch is pressed before the predetermined period of time programmed into the timer expires, the solenoid valve will not close and the engine's performance characteristics will not be affected. A thief, who is unaware of the device as well as the location of the hidden switch, cannot deactivate the device before the fuel restricting solenoid valve moves into its closed position. Once the valve is closed and the fuel supply is thereby restricted, the vehicle's top speed cannot exceed 5 to 10 miles per hour. Full power can be restored to the engine only by pushing the hidden switch to open the fuel restricting valve and thereby allowing the fuel to flow freely through the solenoid valve assembly.

When leaving the vehicle, the operator turns "off" the ignition switch initiating a circuit between the ignition switch and the timer controlled solenoid operated fuel restricting valve. With the ignition switch in the "off" position, no power is supplied to either the timer or the solenoid operated fuel restricting valve. When the ignition switch is turned to the "on" position, power is supplied to the timer which begins its count down.

With this system, the operator has no need to remember to activate the anti-hijacking and theft device when leaving the vehicle as it will be activated as soon as the ignition switch is turned to the "off" position. In the event that the operator of the vehicle forgets that the system is armed, when the motor is started the beeper will remind the operator to deactivate the system by pushing the concealed switch button. The location of the switch button will be known only to the operator.

Alternatively the push button switch is supplemented with a remote control system. The receiver would be permanently mounted within the vehicle while the transmitting unit would be kept in the possession of the vehicle owner or operator. In the event that the owner/operator is forced out of the vehicle by the hi-jacker and the engine is running, the operator re-activates the anti theft device with the remote control after leaving the vehicle. This re-arms the timer and the vehicle is disabled at the pre-set, programmed time period, the fuel restricting solenoid valve will activate causing an almost complete shutoff of fuel to the engine.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
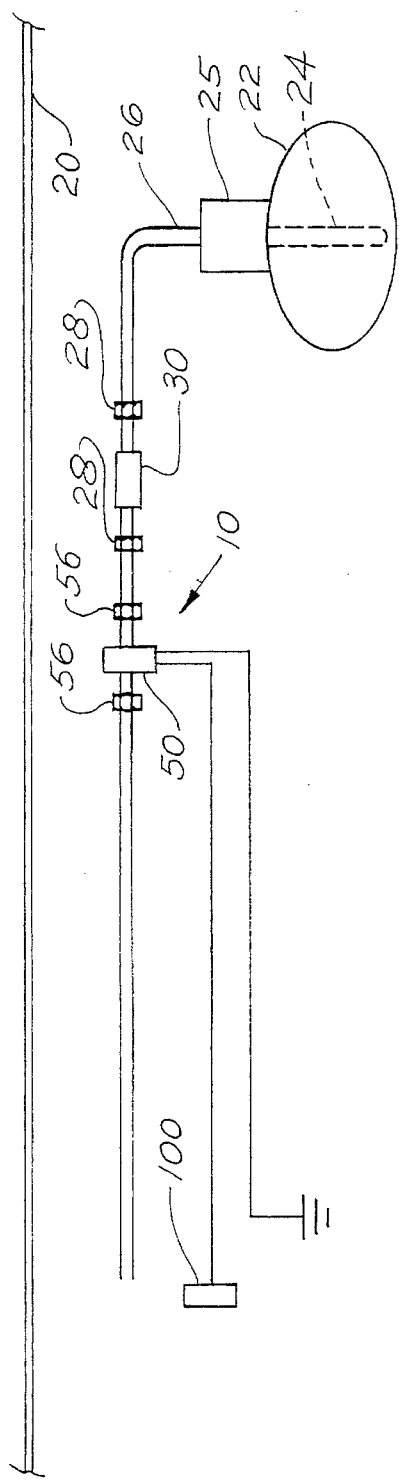
FIG. 1 is a plan view of my anti-hijacking and theft prevention device showing its installation on an automobile.

My invention 10, an anti-hijacking and vehicle theft prevention device, is shown generally in FIG. 1 as installed on a motor vehicle. The vehicle frame is shown at 20. Fuel contained within fuel tank 22 is siphoned through fuel pick up tube 24 by fuel pump 25 and is pumped into fuel line 26. Fuel filter 30, connected to fuel line 26 between two compression fittings 28, filters the fuel in a known manner. Adjacent fuel filter 30 and connected to fuel line 26, between Ferrul-Loc fittings 56, is located fuel restricting solenoid valve assembly 50. Fuel line 26 then extends from fuel restricting solenoid valve assembly 50 to the engine of the motor vehicle.

Figure 2:
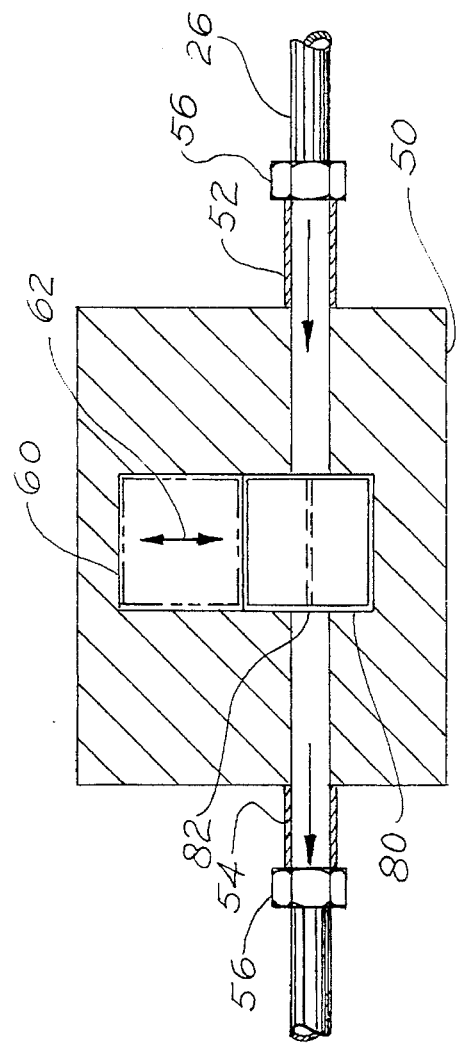
FIG. 2 is a partially cut-away expanded view of a portion of the fuel restricting solenoid valve showing the fuel restricting valve interchangeable orifice in the restricted position.

FIG. 2 shows an expanded view of a portion of the fuel restricting solenoid valve assembly 50 including inlet 52, valve chamber 60, and outlet 54. Interchangeable solenoid operated fuel restricting valve 80 having a restricting orifice 82 moves in valve chamber 60 between "open" and "closed" positions as shown by arrow 62. When the interchangeable valve 80 moves into the "closed" position, as shown in FIG. 2, fuel flow from fuel tank 22 to the engine is restricted. When only a small amount of fuel is permitted to flow through orifice 82 of interchangeable valve 80, the performance characteristics of the vehicle engine are greatly affected. The restricted fuel flow resulting from the interchangeable valve 80 being in the closed position allows the vehicle engine to run at only an idle speed. While the power steering and power brakes, if the vehicle is so equipped, are still functional, the vehicle's maximum speed is reduced to only 5 to 10 miles per hour. A vehicle whose top speed is limited within this range is virtually useless, especially to a thief who is attempting a get-away. In the "open" position, fuel is allowed to flow freely from fuel line 26 through inlet 52, through valve chamber 60, and through outlet 54 back into the fuel line 26. When the interchangeable solenoid operated fuel restricting valve 80 is in this position, the vehicle engine runs in its normal way and its performance characteristics are not affected.

Figure 4:
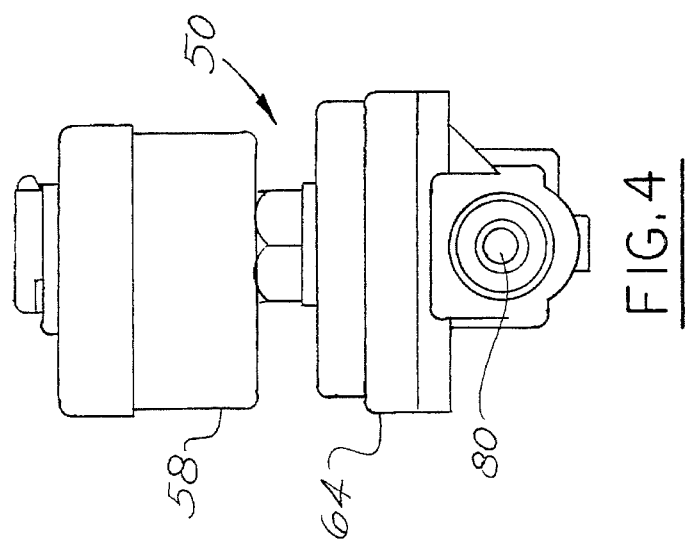
FIG. 4 is an end view of the fuel restricting solenoid valve.
Figure 3:
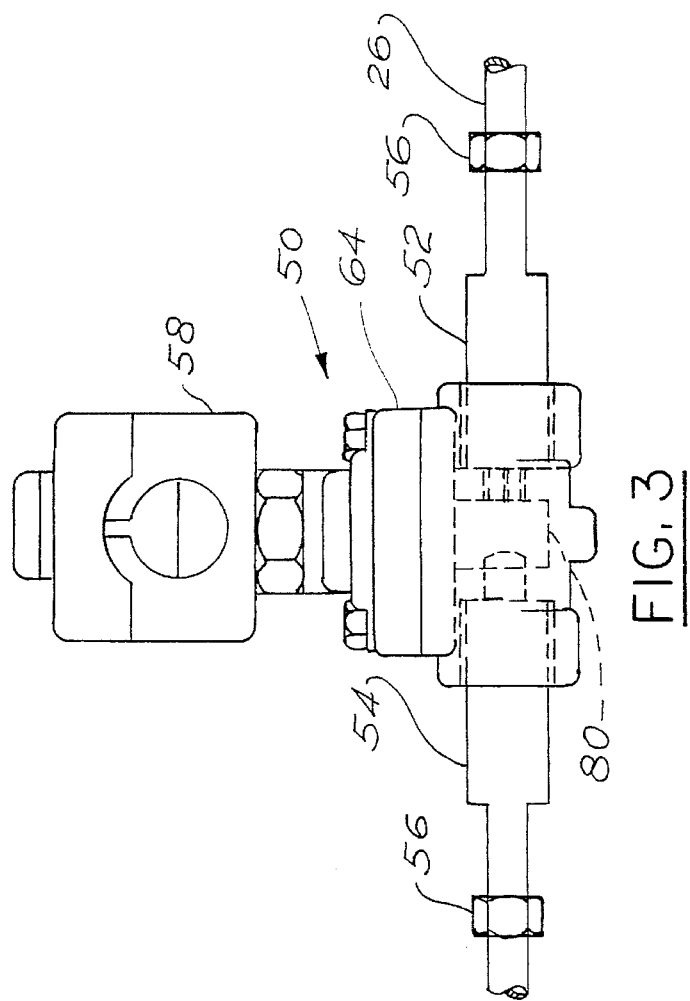
FIG. 3 is a side view of the fuel restricting solenoid valve.

The fuel restricting solenoid valve assembly 50 is shown in its entirety in FIGS. 3 and 4. Solenoid valves are well known in the art. While any solenoid valve could be used in the present invention, a solenoid valve manufactured by Automatic Switch Co., Florham Park, N.J. 07932 is used in the preferred embodiment. Specifically, Asco model OPSC8210G33V is preferred. The solenoid valve 50 has an inlet 52, an outlet 54, a solenoid 58, and a valve body 64. The solenoid 58 is attached to the valve body 64. The interchangeable fuel restricting valve 80, which is housed within valve body 64, is attached to the solenoid 58, or more particularly to the solenoid plunger. The plunger is biased by a spring such that the interchangeable valve 80 is in either an open or closed position. In the preferred embodiment of the present invention, the plunger and valve 80 are biased in the open position by the spring. When an electric current is provided to the solenoid 58, the solenoid plunger and fuel restricting valve 80 attached thereto moves into the closed position. The solenoid 58 provides a force sufficient to overcome the force of the spring.

Figure 6:
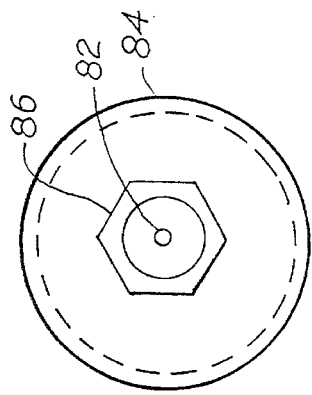
FIG. 6 is an end view of the fuel restricting valve interchangeable orifice.
Figure 5:
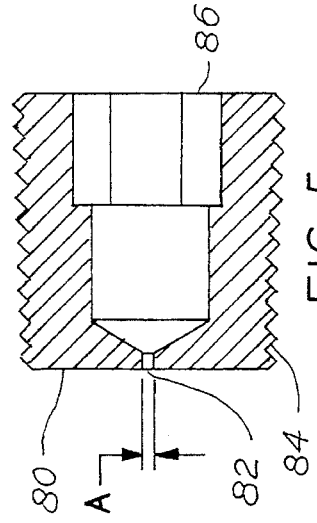
FIG. 5 is a side view of the fuel restricting valve interchangeable orifice.

The interchangeable solenoid valve 80 is shown in FIGS. 5 and 6. Valve 80 has a central orifice 82. The diameter of the orifice 82 is depicted as "A" in FIG. 5. This diameter varies depending upon the vehicle's make, model, and engine size. The diameter A must be large enough to supply enough fuel to the engine to prevent the engine from stalling but small enough to restrict the top speed of the vehicle to no more than 5 to 10 miles per hour. Experimentation has shown that an orifice 82 diameter A of 0.005 inches is required for a 1989 Buick LeSabre while an orifice 82 diameter A of 0.008 inches is required for a 1984 Cadillac Coup de Ville. Because different orifice diameters are required for different vehicles, the valve 80 has a threaded exterior portion 84 and a hexagonal opening 86. A hexagonal tool is inserted into hexagonal opening 86 to install or remove valve 80 from valve body 64. In this way, the same solenoid valve assembly 50 can be used in any vehicle. It is only necessary to change the interchangeable valve 80 depending upon the orifice 82 diameter A for the selected make, model and engine size of the vehicle into which my device will be installed.

Figure 7:
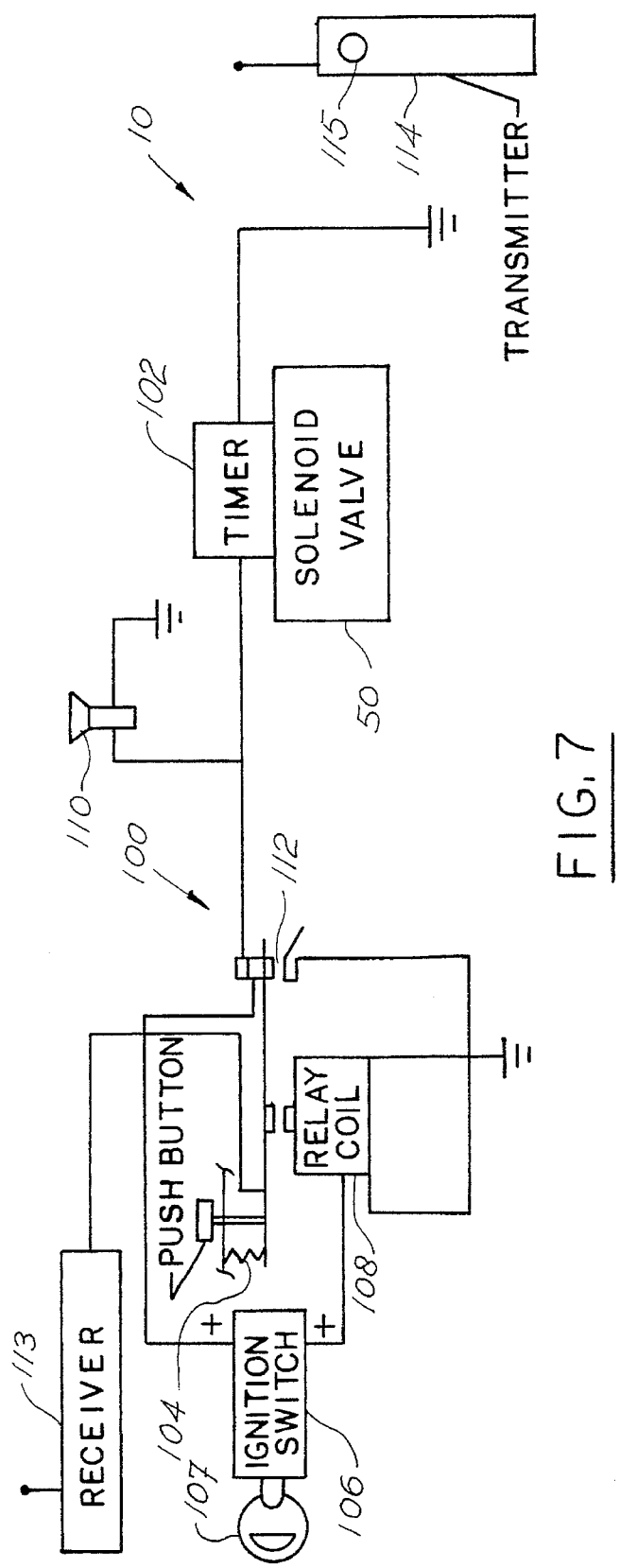
FIG. 7 is a schematic diagram of the anti-hijacking and theft prevention device.

FIG. 7 schematically shows the electrical circuit 100 of my invention connected to the fuel restricting solenoid valve assembly 50. When the ignition key 107 is inserted into ignition switch 106 and turned to the "on" position and the engine is started, the timer 102 will start to count down to its "off" position and the beeper 110 will simultaneously sound. The beeper 110 signals to the operator of the vehicle that the timer 102 has begun its count down and will disable the vehicle in 45 seconds. If the timer 102 is permitted to time out, the fuel restricting solenoid valve 50 is activated causing an almost complete shut off of fuel from the fuel tank to the engine. Only a restricted amount of fuel that can pass through orifice 82 of valve 80 will be provided to the engine. The engine will continue to run but at a very slow and hesitating speed. The power brakes and power steering system of the vehicle will still be operational but the vehicle will be capable of 5 to 10 miles per hour. While the owner or operator of the vehicle simply presses the hidden switch 104 to prevent the timer 102 from timing out, a thief who is unaware of the device and the location of the switch 104 will not be able to deactivate the device 10 before fuel flow is restricted.

If the owner or operator fails to press switch 104 before timer 102 times out and fuel flow is restricted, full power to the engine can be restored by pushing the hidden push button switch 104 thereby opening the contact 112 to the solenoid operated fuel restricting valve and energizing the relay solenoid 108 to keep the circuit energized. When energized, the interchangeable solenoid operated fuel restricting valve is maintained in the open position within the valve chamber 60 thereby allowing fuel to freely flow through valve chamber 60.

When leaving the vehicle, the operator turns "off" the ignition switch 106 allowing the relay 108 to initiate a circuit between the ignition switch 106 and the timer 102 connected to the solenoid operated fuel restricting valve 50. With the ignition switch 106 in the "off" position, no power is supplied to either the timer 102 or the solenoid operated fuel restricting valve 50. The circuit 100 is ready to supply power to the timer 102 when the ignition switch is turned to the "on" position. The circuit 100 will supply power to the fuel restricting solenoid valve assembly 50 to activate the valve 80 when timer 102 times out.

With this system, the operator has no need to remember to activate the anti-hijacking and theft device 10 when leaving the vehicle as it will be activated as soon as the ignition switch 106 is turned to the "off" position. In the event that the owner or operator of the vehicle forgets that the system is armed, when the engine is started the beeper 110 sounding will remind the operator to deactivate the device 10 by pushing the concealed switch button 104. The location of the button 104 will be known only to the owner or operator of the vehicle.

Alternatively, the switch button 104 is supplemented with a remote control system. The system comprises a receiver 113 which is permanently mounted within the vehicle and a transmitter 114 which is kept in the possession of the owner or operator. Adding a remote control system to switch 104 has an added advantage. If a vehicle hi-jacking should occur by a perpetrator forcibly entering a running vehicle that is occupied by the operator and the perpatrator subsequently forces the operator from the vehicle, the operator can activate the present invention 10 by simply pressing the button located on the transmitter. The remote control switch 115 will de-energize the relay coil 108 and re-arm the timer 102. The timer 102 will begin its 45 second count down period whereafter the solenoid valve 80 will move into its closed position and the vehicles speed will be limited to between 5 and 10 miles per hour.

The foregoing is considered as illustrative only of the principles of the invention. Furthermore, since numerous modifications and changes will readily occur to those skilled in the art, it is not described to limit the invention to the exact construction and operation shown and described. While the preferred embodiment has been described, the details may be changed without departing from the invention, which is defined by the claims.

What is claimed is:

1. An anti-hijacking and theft prevention device for a motor vehicle having a fuel supply and an ignition switch, the device comprising:

a solenoid valve located in the fuel supply, the valve having a fuel restricting orifice formed therethrough;

a timer for timing a predetermined period of time, the timer connected to the valve;

a deactivating switch connected to the timer;

the valve moving from an open position to a closed position when the deactivating switch remains inactivated during the predetermined time period.

2. The anti-hijacking and theft prevention device of claim 1 further including a beeper connected to the timer, the beeper emitting an audible signal during the predetermined time period.

3. The anti-hijacking and theft prevention device of claim 1 wherein the deactivating switch is located in a transmitter and a receiver is connected to the timer.

4. The anti-hijacking and theft prevention device of claim 1 wherein the predetermined time period begins when the ignition switch is activated.

5. An anti-hijacking and theft prevention device for a motor vehicle having a fuel supply and an ignition switch, the device comprising:

a valve assembly having an inlet, an outlet, a valve body, and a valve;

the valve assembly connected to the fuel line between the inlet and the outlet;

an aperture formed through the valve;

a solenoid connected to the valve body, the solenoid having a solenoid plunger;

the solenoid plunger connected to the valve;

a valve spring located within the valve assembly and biasing the valve in an open position;

a control means for controlling the solenoid, the control means connected to the solenoid.

6. The anti-hijacking and theft prevention device of claim 5 wherein the control means includes a timer for timing a predetermined amount of time and a deactivating switch for deactivating the timer.

7. An anti-hijacking and theft prevention device for a motor vehicle having a fuel line and ignition switch, the device comprising:

a valve installed on the fuel line, the valve having an orifice formed therethrough;

a solenoid for moving the valve from an open position to a closed position, the solenoid connected to the valve;

a control means for controlling the solenoid connected to the solenoid and to the ignition switch;

the control means including a deactivating switch;

the control means maintaining the valve in the open position for a predetermined period of time after the ignition switch is activated;

the control means activating the valve into the closed position at the end of the predetermined period of time provided the deactivating switch has not been activated.

8. A method for preventing hijacking and theft of a motor vehicle having a fuel supply and an ignition switch with a device having a fuel restricting solenoid valve, the valve having a fuel restricting orifice formed therethrough; a timer for timing a predetermined time period connected to the valve; a deactivating switch connected to the timer, the method comprising the steps:

installing the fuel restricting solenoid valve in the fuel supply;

activating the timer;

closing the fuel restricting valve when the predetermined period of time expires.

* * * * *